(12) United States Patent
Singh et al.

(10) Patent No.: US 9,628,363 B2
(45) Date of Patent: Apr. 18, 2017

(54) NETWORK USAGE MONITORING AND ANALYTICS FOR DIFFERENTIATED DATA SERVICES

(71) Applicant: Accenture Global Services Limited, Dublin (IE)

(72) Inventors: Madan Kumar Singh, Bangalore (IN); Sachin Sehgal, Gurgaon (IN); Per Osterman, Stockholm (SE); Petter Bohman, Stockholm (SE); Niclas Poldahl, Stockholm (SE)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 173 days.

(21) Appl. No.: 14/707,797

(22) Filed: May 8, 2015

(65) Prior Publication Data
US 2015/0326461 A1 Nov. 12, 2015

Related U.S. Application Data

(60) Provisional application No. 61/990,227, filed on May 8, 2014.

(51) Int. Cl.
| | | |
|---|---|---|
| *G06F 15/173* | (2006.01) | |
| *H04L 12/26* | (2006.01) | |
| *H04L 12/24* | (2006.01) | |

(52) U.S. Cl.
CPC ............. *H04L 43/12* (2013.01); *H04L 43/04* (2013.01); *H04L 43/0876* (2013.01); *H04L 41/142* (2013.01)

(58) Field of Classification Search
CPC .............. G06Q 10/06315; G06Q 10/06; G06F 11/3433; G06F 2009/4557; G06F 2209/508; G06F 9/50

USPC .......................................................... 709/226
See application file for complete search history.

(56) References Cited

U.S. PATENT DOCUMENTS

| | | |
|---|---|---|
| 8,019,683 B1 | 9/2011 | Swanburg et al. |
| 9,351,193 B2 * | 5/2016 | Raleigh ................. H04M 15/80 |
| 2010/0192207 A1 * | 7/2010 | Raleigh ............ G06Q 10/06375 |
| | | 726/6 |

(Continued)

FOREIGN PATENT DOCUMENTS

WO 2009/053955 A2 4/2009

OTHER PUBLICATIONS

Serdar Vural et al: "Survey of Enperimental Evaluation Studies for Wireless Mesh Network Deployments in Urban Areas Towards Ubiquitous Internet", IEEE Communications Surveys and Tutorials, Institute of Electrical and Electronics Engineers, US, vol. 15, No. 1, Jan. 1, 2013, pp. 223-239.

(Continued)

*Primary Examiner* — Phuoc Nguyen
(74) *Attorney, Agent, or Firm* — Mannava & Kang, P.C.

(57) ABSTRACT

A system for discovery and analysis of network data usage of users of a communication network may collect information related to data usage over a network. The system may determine network data usage patterns for users from the data usage information. The network usage data, usage patterns and additional information may be analyzed to create user segments, and to analyze network data usage for the user segments. Differentiated data services may be created and implemented based on the network data usage for the user segments.

18 Claims, 14 Drawing Sheets

(56) References Cited

U.S. PATENT DOCUMENTS

2013/0007254 A1* 1/2013 Fries .................. H04L 43/0876
                                                            709/224

OTHER PUBLICATIONS

"The extended European search report", European Patent Application No. 15166992.6, European Patent Office, dated Dec. 15, 2015, 10 pages.

* cited by examiner

Segmentation

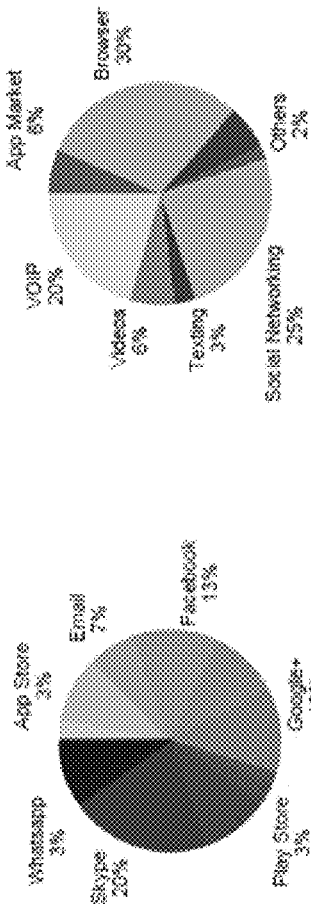
FIG. 8B
Business Users Application Usage
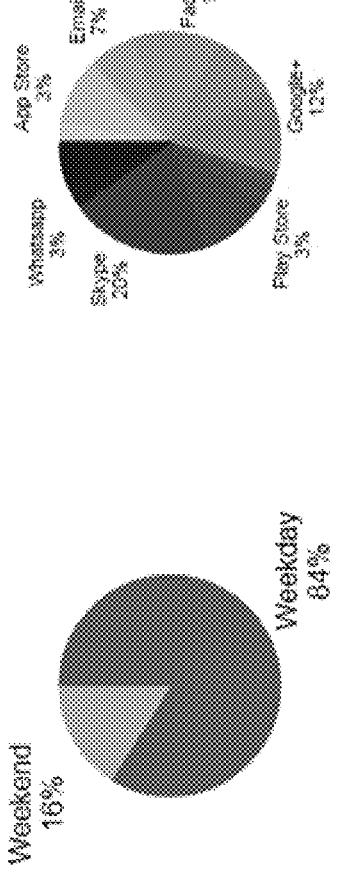
FIG. 8A
Business Users Data Usage
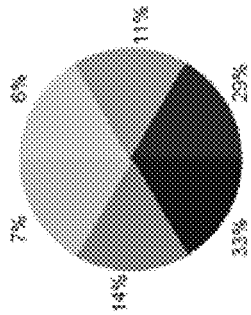
FIG. 8C
Business Users Functional Usage
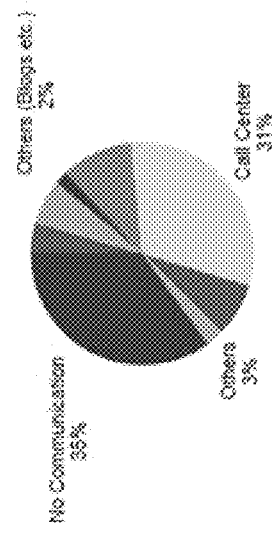
FIG. 8E
Business Users Data Usage by Time of Day
FIG. 8D
Segment Interaction

NETWORK USAGE MONITORING AND ANALYTICS FOR DIFFERENTIATED DATA SERVICES

PRIORITY

This application claims priority to U.S. provisional patent application Ser. No. 61/990,227, filed on May 8, 2014, which is incorporated by reference in its entirety.

BACKGROUND

Companies, such as traditional communications network service providers (e.g., wireline service providers, cellular service providers, cable service providers, satellite service providers, etc.), application-specific service providers, and other types of companies continually attempt to improve quality of service in telecommunications networks for their customers. Major telecommunication providers, cable network carriers and other types of service providers may have extremely large networks in place, which may service thousands or even millions of customers. The array of telecommunications services provided by these carriers can be large and complex. Also, the technical requirements of customers may be diverse. For example, a customer base may vary from small single site voice and data customers up to the largest multi-national corporations which subscribe to hundreds of services across tens, hundreds or even thousands of locations worldwide. Furthermore, network infrastructures of telecommunication providers may span large geographic areas.

Additionally, customers have high expectations for network quality of service in order to run all their applications and services as expected. For example, customers communicate with companies across a variety of touch points, from web chat and Twitter feeds and other social media applications to call centers, and the expectations are the applications and services can run without delay that can be caused by network bandwidth or connectivity issues. These factors, combined with high investment and operational costs for their networks, are posing an unprecedented challenge to service providers to deliver desired network services and applications while meeting expected quality of service.

BRIEF DESCRIPTION OF DRAWINGS

The embodiments of the invention will be described in detail in the following description with reference to the following figures.

FIG. 8A-E are charts of examples of network data usage results for segments and dimensions;

DETAILED DESCRIPTION OF EMBODIMENTS

Figure 1:
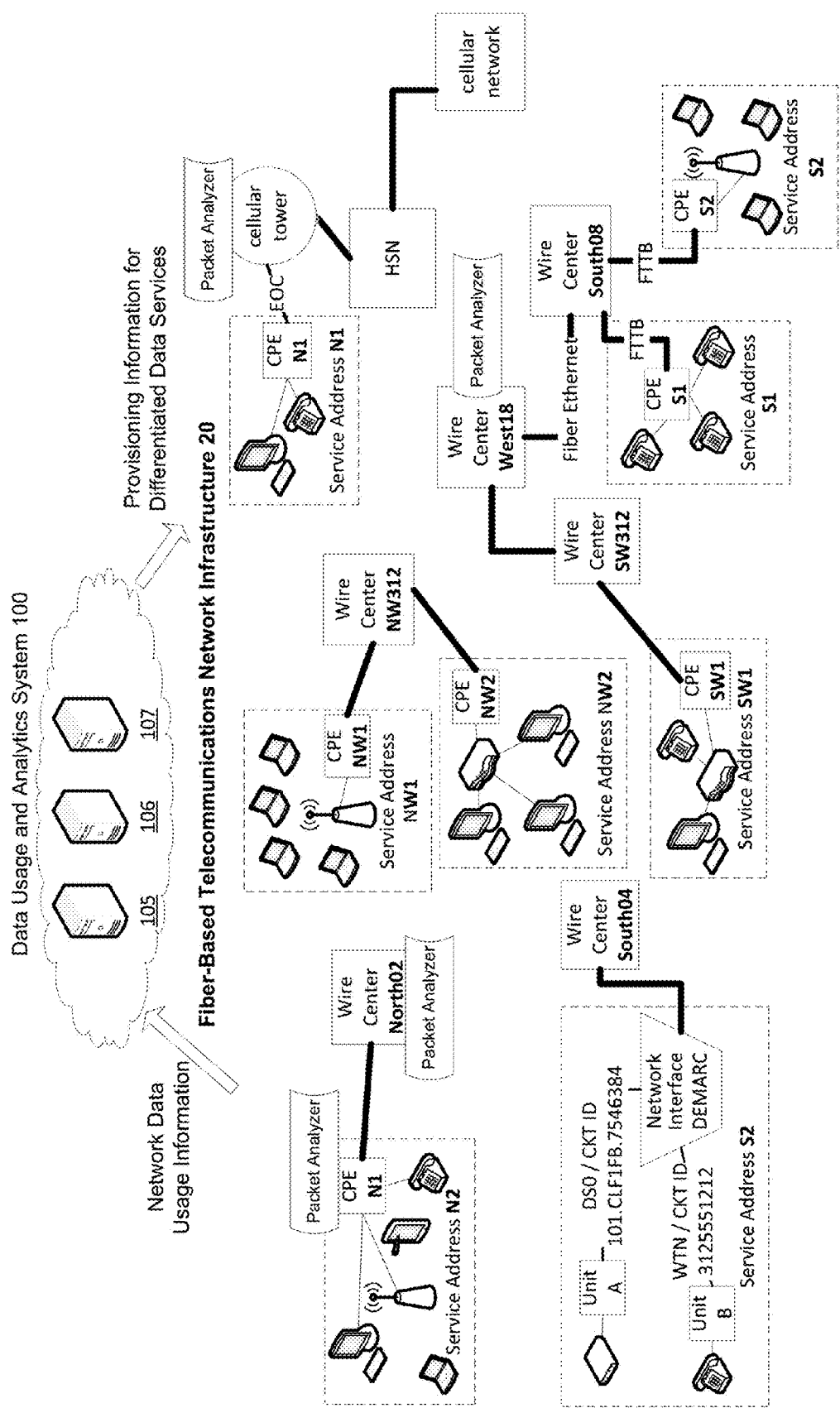
FIG. 1 illustrates a network infrastructure and a system for analyzing network usage data, according to an embodiment.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an embodiment, a system for discovery and analysis of data usage of users of a communication network may collect information related to data usage over a network. This information may be at the byte level or packet level and can identify characteristics of data usage for each byte of data attributed to a particular user that is transmitted over a network. The characteristics may include application, functionality, time of day, etc. In an example, data usage sensors which may be managed by the network infrastructure provider may be used to determine data usage information at the byte-level or packet-level. For example, the data usage sensors may include packet analyzers connected to routers, gateways, or other types of network switches or network devices in the network to identify applications associated with the packets. Applications for example are computer applications, such as social media applications, VOIP, Internet chat, e-commerce applications, etc.

The system may determine network data usage patterns for users from the data usage information. The system may collect additional information related to the users and related to the network data usage, including customer interaction data, customer behavior data, and customer demographic data. The network usage data, usage patterns and additional information may be analyzed to create user segments, and analyze network data usage for the user segments.

The segments may include groups of users having similar data usage patterns. According to an embodiment, a bundle of related applications used by the users in a segment is determined and an amount of data used by the bundle of related applications is also determined. From this information different data service offerings may be determined and differentiated data services may be determined and applied for the network usage. For example, the differentiated data services may include increased data allocation and/or increased data transmission speed. For example, network bandwidth for the segment may be increased or decreased at different times of the day, week, month, etc., based on the bundle of applications and the data usage patterns for the bundle of applications. Modification of network bandwidth may include modification of uplink and/or downlink bandwidth. Other modifications may be made for the differentiated data service to improve quality of service. Quality of service may be based on or impacted by latency, jitter, packet loss, etc. The system may also include a network management server operable to apply the one or more differentiated data services only to the bundle of related applications used by the users in the segment. A user segment may be considered to represent network data usage for a group of users determined to be in the segment.

Multiple technical problems may be solved by the embodiments described herein. For example, a technical problem is how to improve network quality of service for users within the constraints of the existing network demand and infrastructure. According to an embodiment differentiated data services may be determined to increase quality of service for a segment of users while minimizing quality of service degradation for another segment of users.

Other examples of technical problems may include determining network sizing for network infrastructure upgrades and determining a rollout procedure that minimizes service disruption. According to an embodiment, in addition to providing differentiated data services, different data service offerings may be determined for a segment based on the usage data determined for the segment. Additionally, usage data across segments may be aggregated to determine where network upgrades are needed, such as which segments have the greatest need or can have the greatest benefit from network upgrades and also to determine network sizing for the new infrastructure. Additionally, a rollout procedure to deploy new network infrastructure and/or new services that minimize service disruption and maximizes customer migration to the new infrastructures and services may be determined based on the current usage data and estimated network usage data for segments.

A service as used herein may include the supplying or providing of information over a network, and is also referred to as a communications network service. Examples of services include but are not limited to any voice, data, cable or satellite television, streaming audio or video, etc., provided over a network. A differentiated data service is a service that is modified. A modification may be to accommodate data usage and provide a particular level of quality of service. A differentiated data service may allocate increased bandwidth or include other modifications based on data usage patterns for a segment. Thus, if a data service is configured to stream audio, a differentiated data service corresponding to the data service could be configured to stream audio at an increased bandwidth (e.g. 10% more bandwidth).

Network infrastructure refers to the hardware and software resources of a network that enable network connectivity, communication, operations and management of a network. Network infrastructure provides the communication path and services between users, processes, applications, and other networks. Network infrastructure may include network hardware (e.g., routers, switches, network cards, wireless routers, cables, connectors, servers, etc.), network software (e.g., network operations and management, operating systems, firewall, network security applications, etc.) and communication mediums and protocols. The network infrastructure may support wired and/or wireless networks and services. A service provider provides services, for example, to customers over a network. The service provider may manage and maintain the network infrastructure.

FIG. 1 illustrates a data usage and analytics system 100 which may collect data usage information from the network infrastructure 20. The network infrastructure 20 may include infrastructure for any type of network, such as a cellular network, an IP fiber-based telecommunications network, and/or other types of networks. Data usage monitors may be provided in the network to analyze network usage. In an example, data usage may be monitored at the packet level or byte level. For example, packet analyzers may be connected to network devices, such as network switches, routers or other types of network devices. The packet analyzers may analyze the packet headers and/or payloads to determine network usage data for users. The network usage data may be stored in tables as it is captured for subsequent retrieval.

The system 100 may include one or more servers. Servers 105-107 are shown but the system 100 may be implemented by more or less number of servers or by other types of computer systems. The servers for monitoring and capturing network parameters, including bandwidth, latency, etc. Also, the servers may query the network hardware to determine addresses, such as media access control addresses and IP addresses of hardware devices in the network infrastructures and other configuration parameters and network usage data information.

The servers may include a database server 107 storing network usage data and other data used by the system 100 to analyze network usage data. Server 106 is a network analytics management server that is operable to analyze the network usage data and determine user segments and differentiated data services for the user segments as is further described below. The servers may include a network provisioning server to configure hardware devices, for example, in the network infrastructure 20 for differentiated data services. The provisioning server 105 may remotely perform discovery and capture network parameters of existing switches via a network in the infrastructure 10 and remotely configure switches or other network devices in the infrastructure 20 to accommodate differentiated data services.

Figure 2:
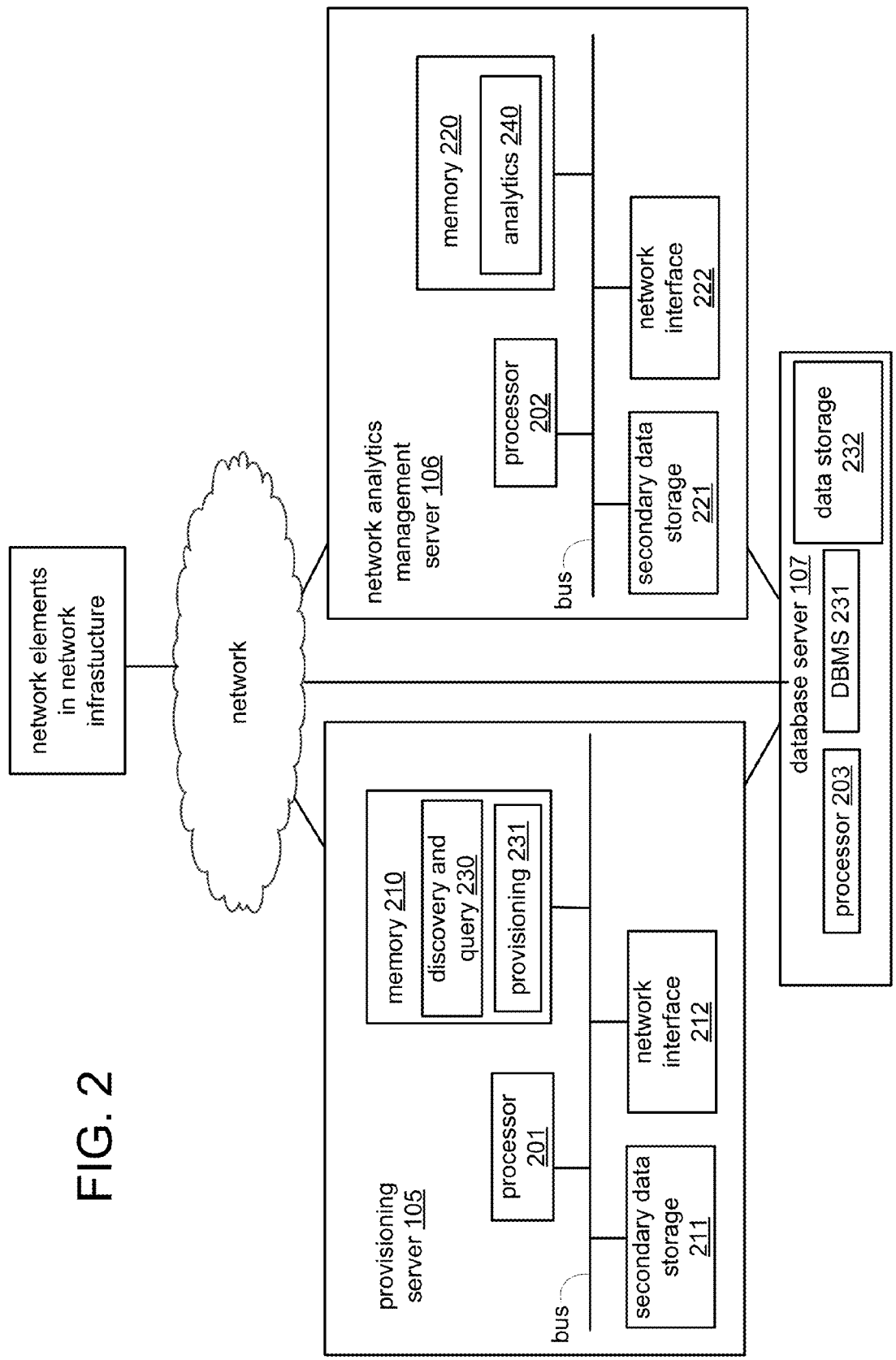
FIG. 2 illustrates servers for the service provider network migration system, according to an embodiment.

FIG. 2 shows an example of the provisioning server 105, the network analytics management server 106 and database server 107.

Hardware is shown for the servers 105-107 which may be used as a platform for executing one or more of the methods and functions described herein. The methods and functions may be embodied as software stored on one or more non-transitory computer readable storage mediums. The servers 105-107 may each include one or more hardware processors 201-203 that execute machine readable instructions for the software. The servers 105 and 106 also include main memory 210 and 220, such as a random access memory (RAM), where the software and data for processors 201 and 202 reside during runtime, and secondary data storage 211 and 221, which may be non-volatile and store software and data. The memory and secondary data storage are examples of non-transitory computer readable storage mediums that may be included in the servers 105 and 106. The servers 105 and 106 include network interfaces 212 and 222 for connecting to network elements and other servers and computer systems via a network. The network elements may include equipment shown in FIGS. 1A-B for the network infrastructures 10 and 20. It will be apparent to one of ordinary skill in the art that the severs 105 and 106 may include other known components that are not shown.

As shown, the provisioning server 105 may store and execute software 230 for discovery and collection of network usage data and query and configuration of network elements in the network infrastructure 120 via a network.

Software 231 for provisioning network elements may be stored and executed by the server 105. Provisioning may include setting network parameters for network elements remotely via a network so the network elements perform the desired functions in the network infrastructure. In one example, a software defined networking (SDN) protocol is used to set network parameters. The software 231 may include a rich set of application program interfaces (APIs) that manage and manipulate network elements. The network elements may include software modules that can be remotely configured by the server 105 to perform the desired functions and desired network parameters are set in the network elements, which may include automated provisioning of network addresses, assigning specific quality of service and latency parameters, etc.

The network analytics management server may include analytics software 240. The software 240 may include software for analyzing network usage data and performing other functions and operations as described with respect to FIGS. 4A-B. The servers 105 and 106 may be connected via one or more networks to each other and equipment in the infrastructures 10 and 20.

Database management server 207 may include a DBMS 231 and data storage to store the data for the database, which may include memory, hard drives, etc.

Figure 3:
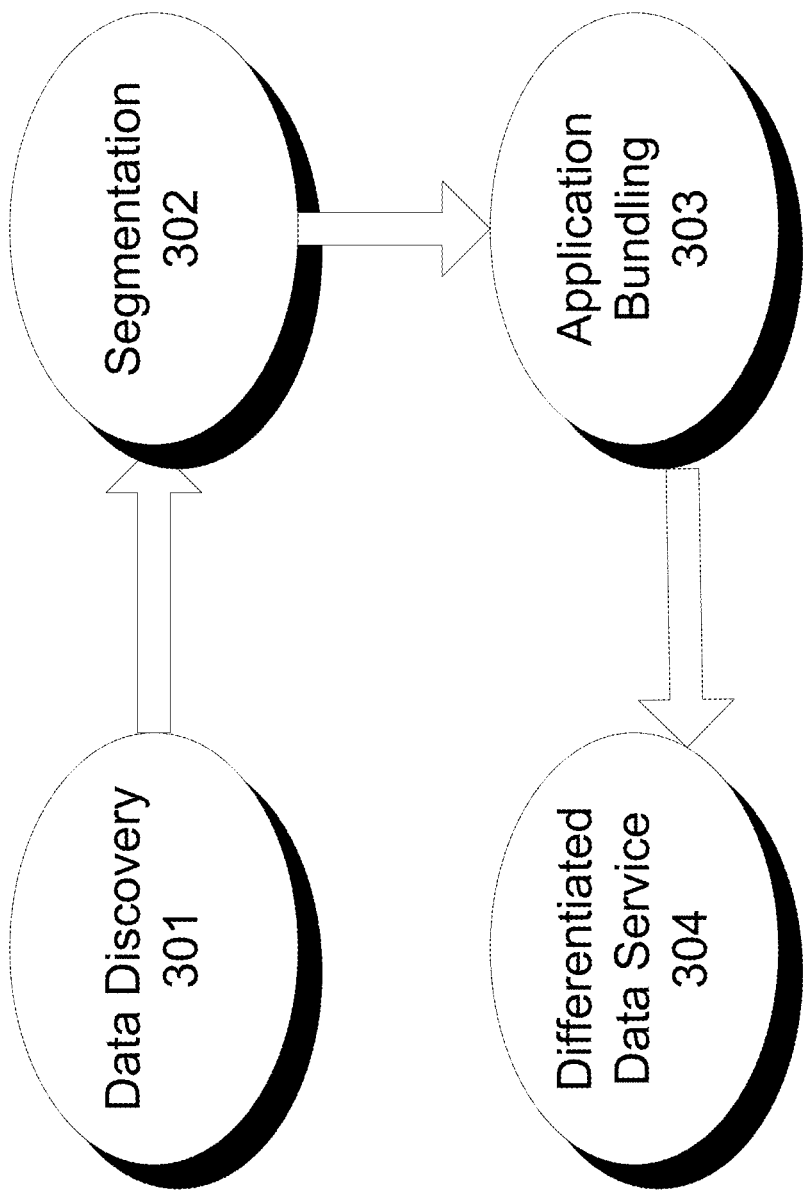
FIG. 3 illustrates a block diagram of functions performed by a system, according to an embodiment.

FIG. 3 shows functional blocks describing operations performed by the system 100. It will be apparent to one of ordinary skill in the art that the system 100 may be comprised of hardware and/or software which includes machine readable instructions stored on a non-transitory computer readable medium and executable by at least one processor to implement the blocks.

At 301 data discovery is performed to collect network usage data and other information for users. The users may be customers of a service provider, such as customers of a cellular service provider, cable service provider, etc. At 302, segmentation is performed to determine segments of the users based on the information determined from the data discovery. The user segments may be associated with different categories of network data usage and different behaviors of network usage. At 303, application bundles are determined. The network usage data and behavior may be based on applications used by the users that generate data transmitted on the network. The application bundles are determined for each segment that represent applications most used together. At 304, differentiated data services are determined for the application bundles, such as allocating greater bandwidth for the applications or subscribers, or giving higher priorities to packets carrying the application data, etc.

Figure 4A:
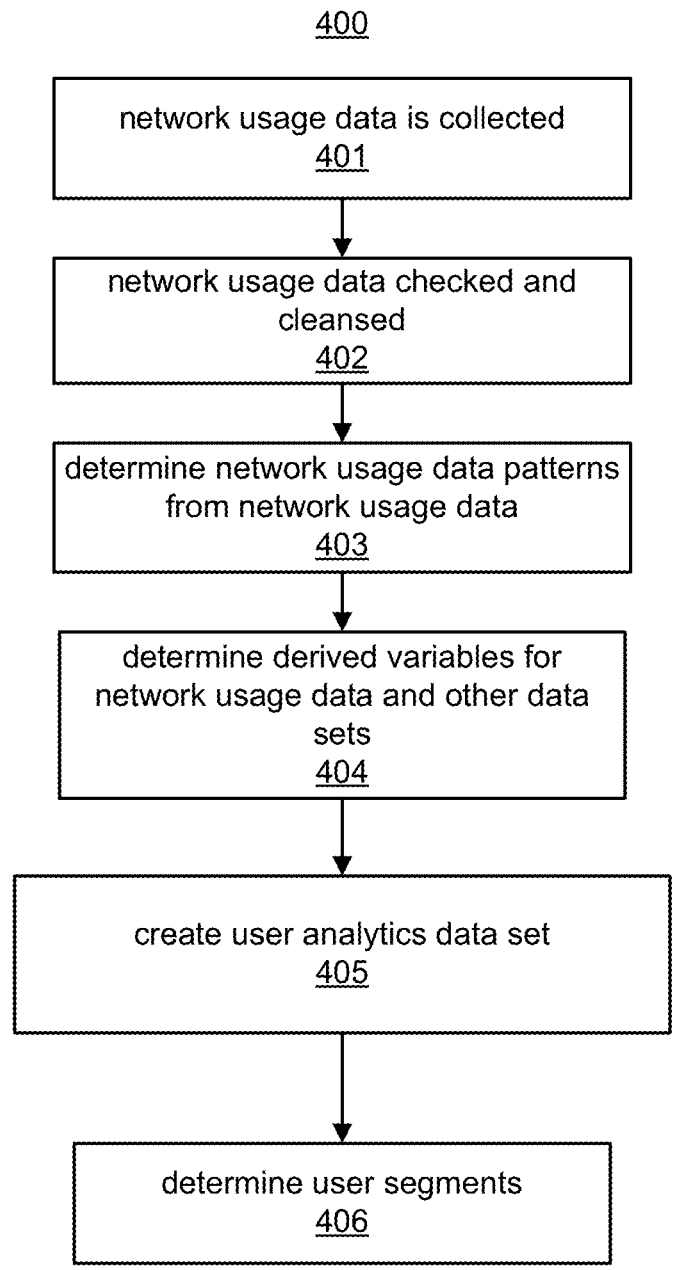
FIGS. 4A-B show methods, according to embodiments.

FIG. 4A shows a method 400 for data usage discovery and analysis, according to an embodiment. The method 400 and other methods and operations described below are described by way of example with respect to the system 100 performing those methods and operations. The methods and operations may be performed by other systems. At 401, network usage data is collected. For example, network analytics management server 106 collects network usage data determined from data usage monitors and other sources. The network usage data may be determined at the packet level or byte level. For example, packets received at network devices in the network infrastructure 20 are analyzed to determine the network data usage information. In an example, a network infrastructure service provider may gather this information, and the information may be for all or a subset of service providers providing data services over the network, and store the information in tables that are accessible by the network analytics management server 106.

The network usage data may include network usage data variables for users, applications generating data transmitted in the network, application functionality, time of day, bandwidth, etc. Application functionality describes the type of application, such as web browser, social media, e-commerce, business or enterprise application, etc. In an example, network usage data for a mobile network may include international mobile subscriber identity (imsi), start time, end time, upload speed, download speed, application functionality, applications, etc.

At 402, the collected network usage data is checked and cleansed. For example, duplicate records are tagged. Outliers may be tagged. Also, columns with insufficient data or of improper type may be tagged. This tagged data may be removed before pattern analysis is performed.

At 403, network data usage patterns are determined from the cleansed network usage data set. For example, pattern analysis is performed to determine usage patterns, such as data usage by for application, functionality, hour of day, weekday usage, weekend usage, network load by location, etc.

Figure 5A:
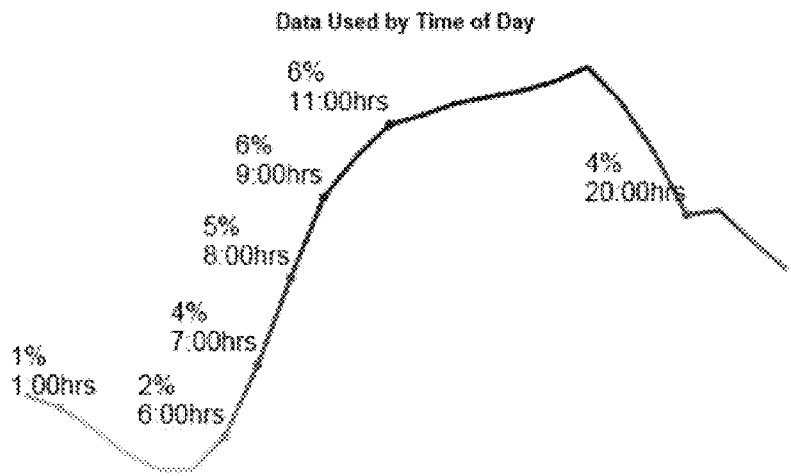
FIGS. 5A-C are charts of examples of data profiling and pattern analysis results.
Figure 5B:
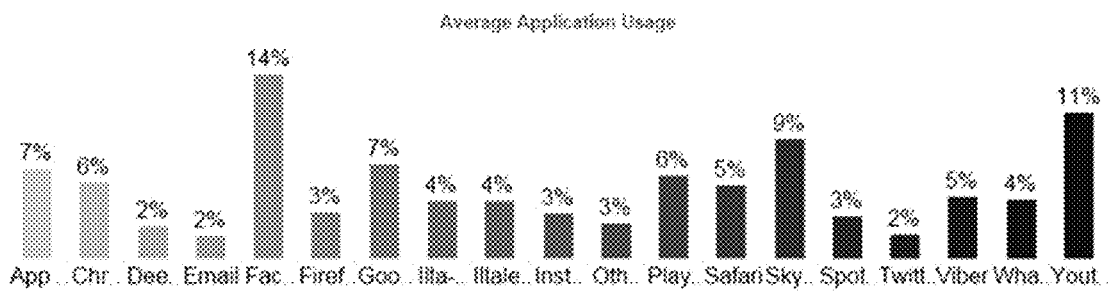
Figure 5C:
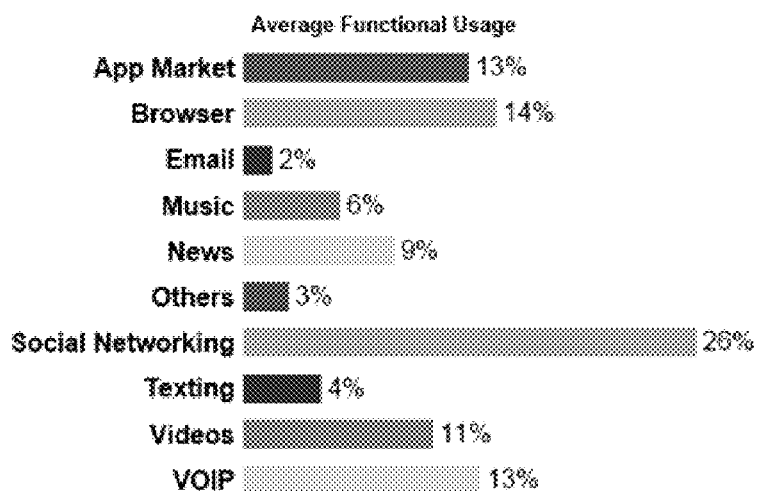

Network usage data patterns may be determined by data pattern analysis techniques that may include one or more of univariate analysis, bivariate analysis and geo-special analysis. The determined patterns may include top network data usage by application, functionality, time, etc. FIGS. 5A-C show examples of data usage determined by time of day, by application and application functionality. From this information the highest network data usage by application, functionality, and time may be determined.

For univariate analysis, each continuous variable may be divided into category of values, such as 5th, 25th, 50th, 75th, 95th, 99th percentile distributions. The frequency distribution is determined to identify top categories. Bivariate analysis is used to find correlations and distributions between two or more variables, such as between upload and download bandwidth by time of day, weekday/weekend, by application, by functionality, by geographic location, etc. The bivariate analysis may identify that certain applications are used more heavily at a certain time of day, or certain demographics use a particular application more often, etc.

At 404, new network usage data variables are created based on the network data usage patterns. These new variables are referred to as derived network usage data variables. For example, the network usage patterns may determine that there is a correlation between multiple network data usage variables, and a derived network data usage variable is created, such as percentage of network data usage by weekday or by weekend day, percentage of data usage by user per application or per application functionality, etc. Derived variables may also be determined from user interaction data, demographics and user behavior data, which are further described below.

At 405, a user analytics data set is created comprised of variables from multiple data sets, including the network usage data. The additional data sets may include user demographic data, user behavioral data, and user interaction data, and each data set includes a set of variables.

Figure 6:
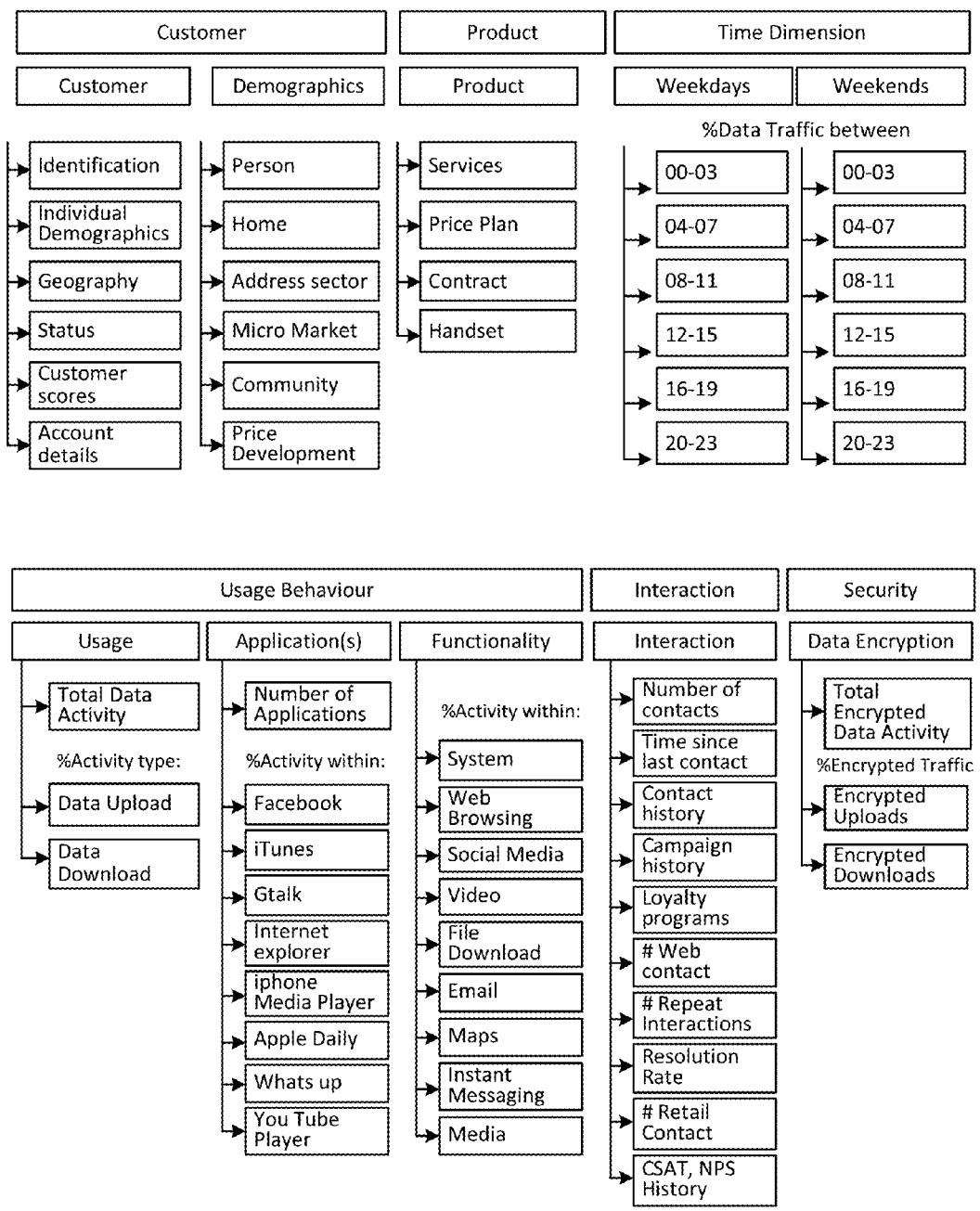
FIG. 6 shows examples of attributes of a customer analytic sphere.

The user interaction data may be from multiple channels and includes information related to the quality of service for data services provided over the network and may describe the user satisfaction level with the data services. The user interaction data may be determined from social media feeds, web chats, customer surveys, etc. User interaction data variables may include customer identifier (ID), caller ID, call disposition, start time, end time, agent name, call type, number of retail visits, number of web interactions, web interaction disposition, tweets related to service, user satisfaction level, etc. User demographic variables may include region, age, income range, products, home owner, education level, etc. User behavior variables may include products usage, product upgrades, billing information, handset, contract type, how long on or off contract, promotional campaigns used, etc. These variables, including network data usage variables and derived variables, are combined to form records for each user, and the records for each user form the user analytics data set. FIG. 6 shows an example of variables that may be included in the user analytics data set.

At 406, user segments are determined from the network usage data, data usage patterns, user interaction data, user demographic data and user behavior data, wherein each user segment represents network data usage for a group of users determined to be in the segment. Variables for the user segments may include an aggregation of variables from the user analytics data set, which is by user, to the segment level. Users for a segment include a group of users that are determined to have similar attributes based on information in the user analytics data set.

Figure 7A:
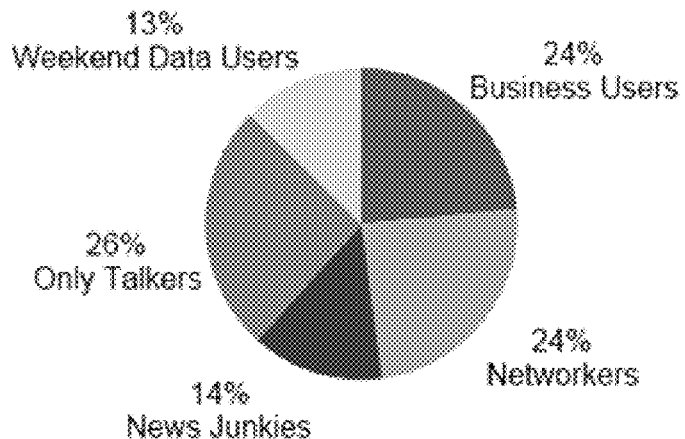
FIGS. 7A-B are charts of examples of customer segments.
Figure 7B:
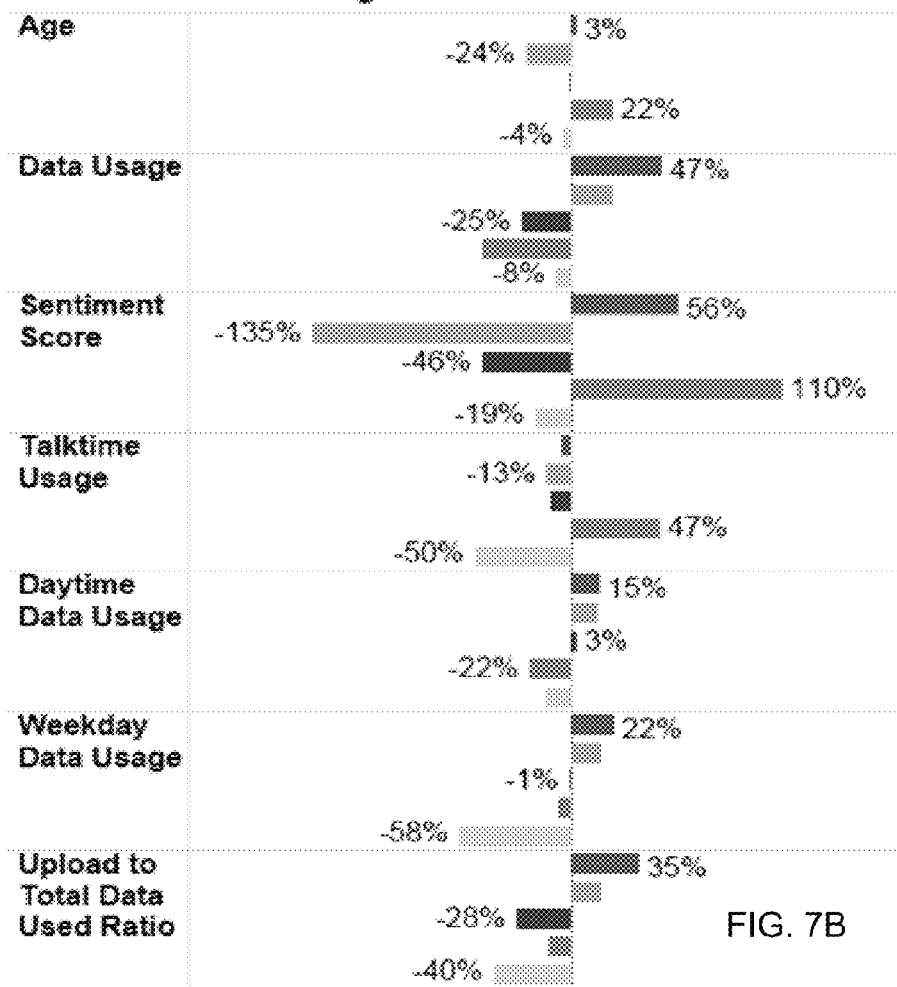

In an example, a clustering function is applied to determine the variables for user segments. For example, through an iterative process, the clustering function identifies a subset (e.g. a proper subset) of the variables from the user analytics data set that are used to categorize users into a segment. For example, the user analytics data set may include hundreds of variables, and the subset of variables determined by the clustering function may comprise ten of those variables. The subset of variables are selected for example based on how well they distinguish the users. Each segment may be defined by a range of values for each of the variables in the subset. FIG. 7A shows an example of different user segments comprised of business users, networkers, news junkies, only talkers and weekend data users. FIG. 7A also shows the percentage of total users in each segment. FIG. 7B shows an example of the subset of variables that are used to define the segments, such as age, data usage, sentiment score, talktime usage, daytime data usage, weekday data usage, and upload to total data used ratio. This analysis may be used as an input to improve quality of service or create bundling offers. FIGS. 8A-E show examples of results for some segments and dimensions. For example, a segment of users is identified for example from a clustering function that is comprised of business users. FIG. 8A shows the percentage of total network data usage for this segment by weekend and weekday. FIG. 8B shows percentage by application; FIG. 8C shows percentage by functionality; FIG. 8D shows percentage of interaction type/channel; and FIG. 8E shows percentage by time of day.

Various clustering functions may be used to determine the segments. For example, K-means clustering may be used to select the subset of variables and to determine the clusters for the segments. K-means clustering may be used to partition observations into k clusters in which each observation belongs to a cluster with the nearest mean. K-means clustering may use a pre-specified number of clusters. K Means clustering is fast and allows flexibility to change clusters. The final determination of clusters may depend on initial seed selection and the number of clusters specified. Another clustering function that may be used is Ward's method, which is a hierarchical method that uses minimum variance criterion to minimize the total within-cluster variance. At each iteration, a pair of clusters with minimum between-cluster distance are merged. Ward's method uses a minimized error sum of squares from the mean. The grouping in Ward's method is based on the distance between observations. Ward's method provides robust and stable results but is relatively slow on large datasets. Another clustering function that may be used is the centroid method, which is a hierarchical method that averages the distance between the centers of two clusters. The grouping is based on distance between observations. The centroid method provides robust and stable results but may be slow on large datasets.

According to an embodiment, different clustering functions may be applied and the clusters are evaluated based on multiple factors, which may be a combination of statistical factors and real-world factors. The statistical factors may include minimum and maximum cluster size, minimum and maximum number of clusters, distance between nearest cluster centroids, maximum root mean square standard deviation, and maximum distance between a seed observation and cluster observations. Real-world factors may include a comparison of users in a segment to a population average to determine whether their behaviors are different with respect to various variables. In addition, each segment should have a distinct business interpretation and differentiated data service offerings should be able to be created for the segment.

Figure 4B:
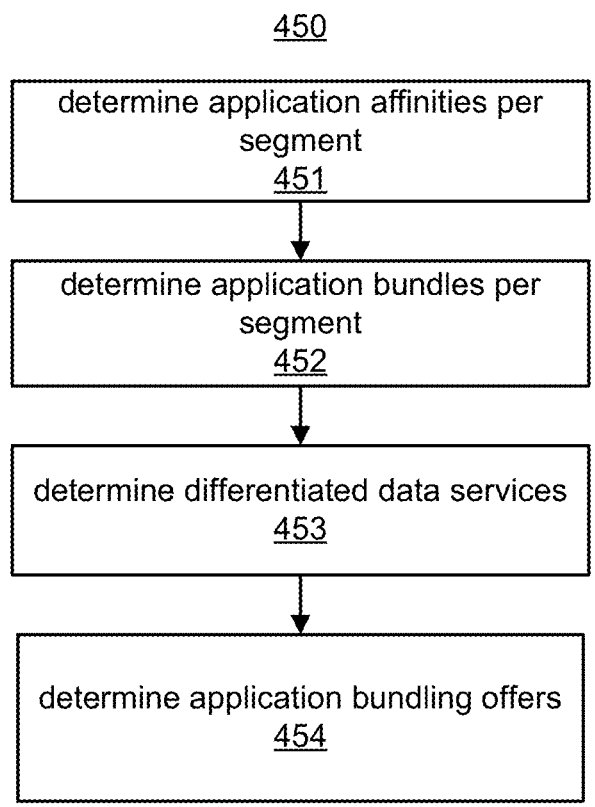

FIG. 4B shows a method 450 for determining application bundles, differentiated data services and offerings per segment. The steps of the method 450 may be performed for the user segments determined from the method 400.

Figure 9A:
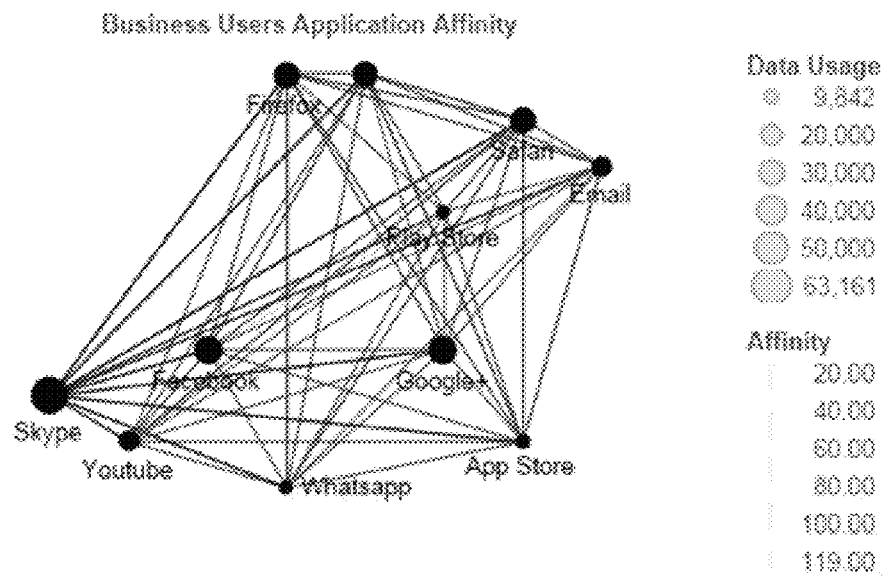
FIG. 9A shows an example of an application affinity chart.
Figure 9B:
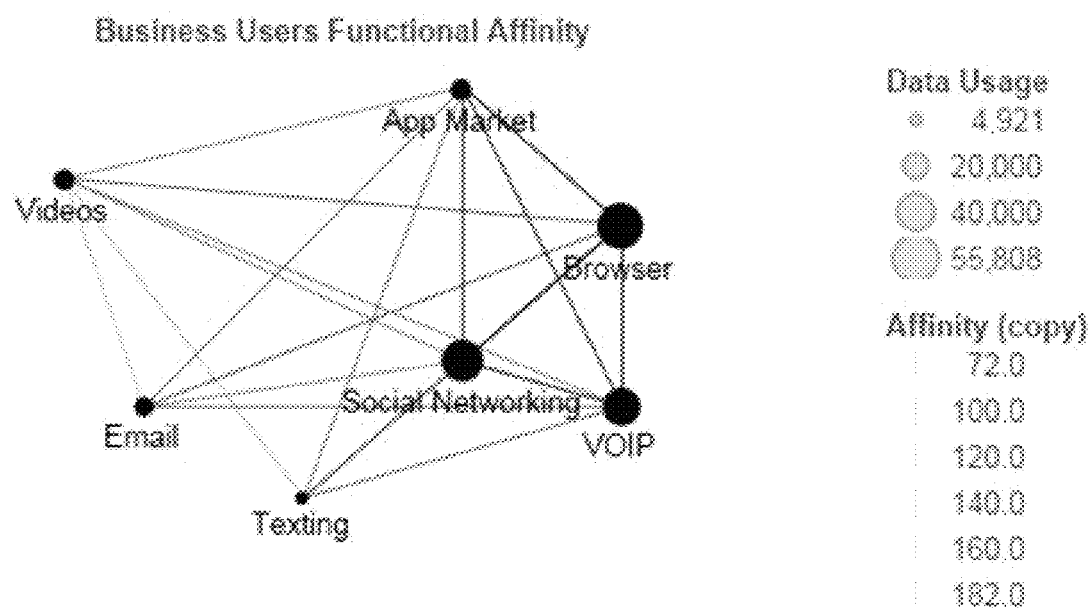
FIG. 9B shows an example of a functional affinity chart.

At 451, application affinities are determined for each segment. The affinities for example are based on how often users in the segment use applications together. Affinities are the affinities of applications. Affinities may be for application functionalities also. The network analytics management server 106 may generate a graphical user interface including affinity graphs. The affinity graphs may include nodes representing applications or application functionalities for the segment, wherein a size or color of the node is representative of an amount of data usage in the segment. The affinity graphs may include edges connecting the nodes, wherein a size or color of each edge is representative of how often the applications or application functionalities of the connected nodes are used together. FIGS. 9A-B illustrate examples of affinity graphs for applications and functionalities.

At 452, application bundles are determined from the affinities. The bundles are applications most often used together in the segment. At 453, differentiated data services are determined for the application bundles and at 454 application bundling offers are determined.

According to an example, a differentiated data service may include a modification of bandwidth allocation for a segment or a bundle of applications determined for the segment. The modification to bandwidth allocation may be determined based on the network usage data patterns determined for the segment at 403 and other factors, including impact of the bandwidth modification on other users. For example, assume a segment for weekend and late-night gamers is identified. The bundle of applications for this segment includes gaming applications. The data usage patterns for the users in this segment indicates that that the upload bandwidth for this segment is on average 20% greater than the other users or segments, and the download bandwidth is 30% greater than the other users or segments. The bandwidth modification for this segment may include increasing the upload bandwidth by 20% and increasing the download bandwidth by 30%. This bandwidth modification may only be implemented on weekends and during late night hours for weekdays. In addition to the data usage patterns for the segment, a network load analysis may be performed to determine whether there is sufficient additional bandwidth available to allocate to the segment. In this example, the increased bandwidth is allocated during off-peak hours and there may be minimal impact on other users of the network. In other examples, where an increased bandwidth is needed during peak load times, the service provider may reduce bandwidth of other segments or may ultimately provision additional infrastructure to provide the additional bandwidth.

Network devices in the network infrastructure, such as routers, gateways, etc., may inspect packets and execute policies to enforce the bandwidth modifications. In the weekend and late-night gamers example, a higher priority can be allocated to packets for the gaming applications of users in the segment to minimize latency and to dynamically allocate bandwidth according to the determined bandwidth modification. The provisioning server 105, shown in FIGS. 1 and 2, may configure network devices with policies that enforce the bandwidth modifications.

The bundle offers may be identified based on the analysis done in the steps of data service usage profiling, application affinity analysis, and based on an estimated monetary value of data used on segment applications and functionalities. Also, a data service value is estimated. Data service value estimation may be conducted to segregate the monetary value of each byte spent by the user on different functionalities and applications, such as email, video, audio, chat, voice over IP (VOIP), messaging, etc.

Figure 10:
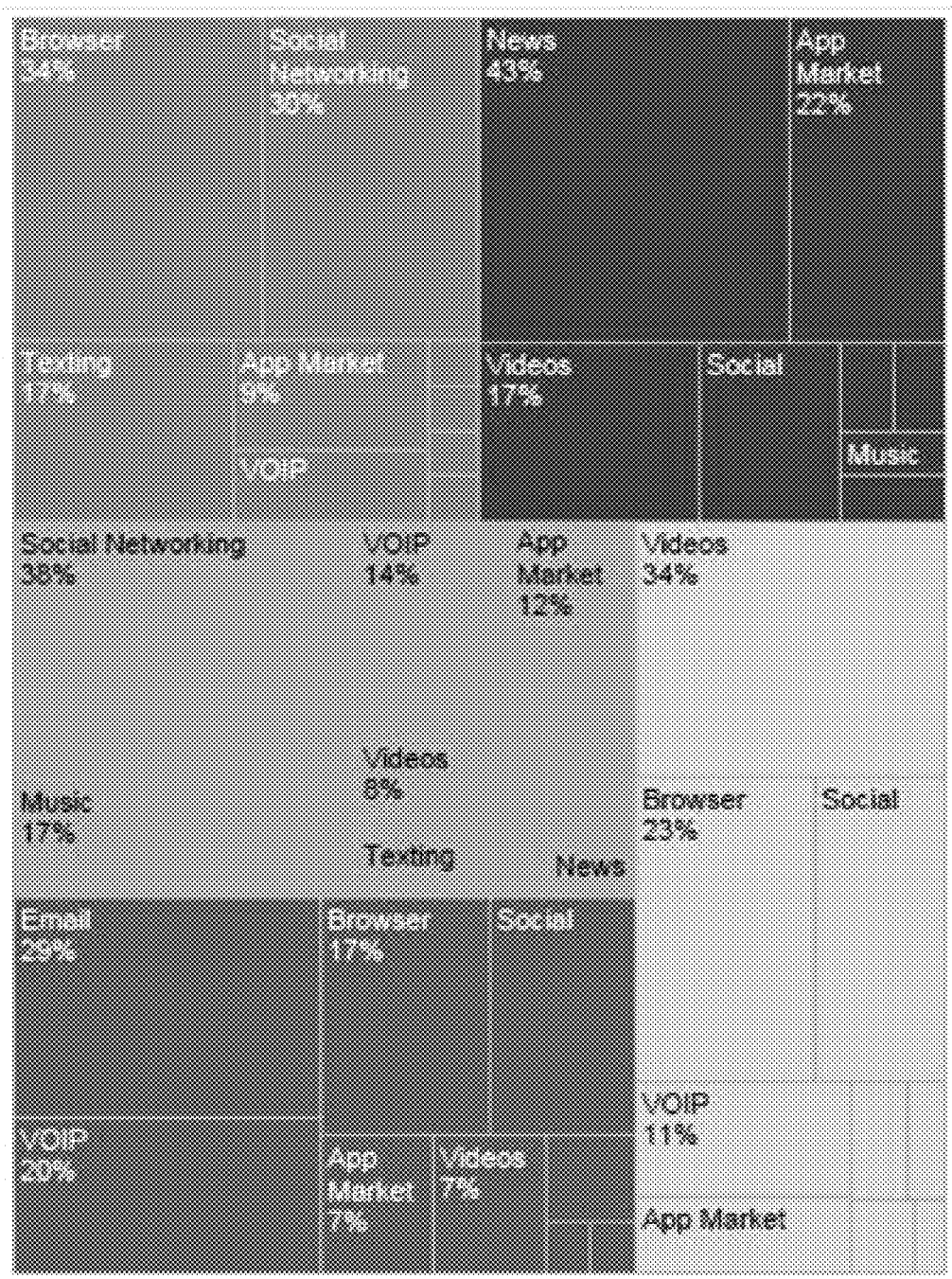
FIG. 10 is a chart of an example of a data service value analysis of the monetary value of functions by segment.
Figure 11:
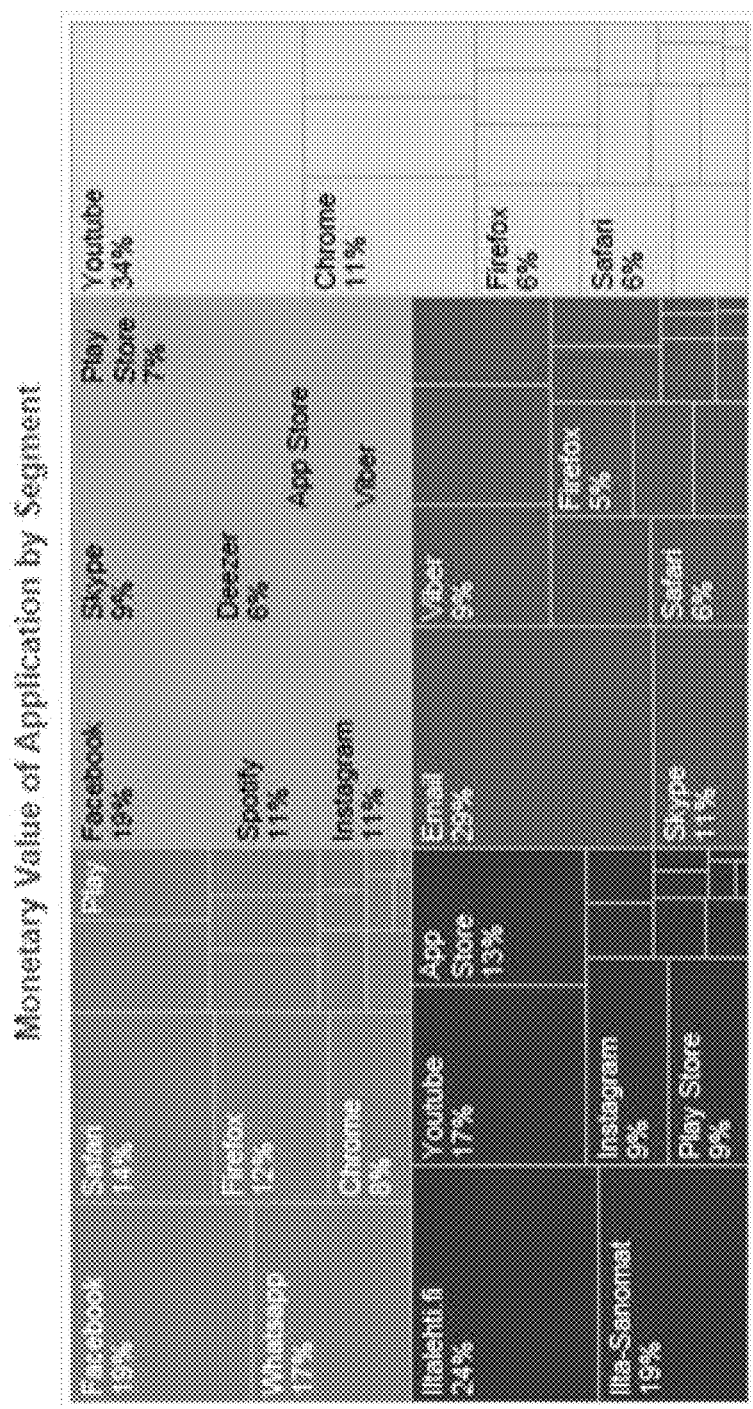
FIG. 11 is a chart of an example of a data service value analysis of the monetary value of applications by segment.

In one embodiment, a multivariate regression analysis may be performed with the dependent variable as money spent and data service usage by application and functionality as independent variables. The analysis may be conducted at the segment level to discover the monetary value that each segment associates with different functionalities and/or applications. FIG. 10 shows an example of a data service value analysis of the monetary value of functions by segment. FIG. 11 shows an example of a data service value analysis of the monetary value of applications by segment.

Figure 12:
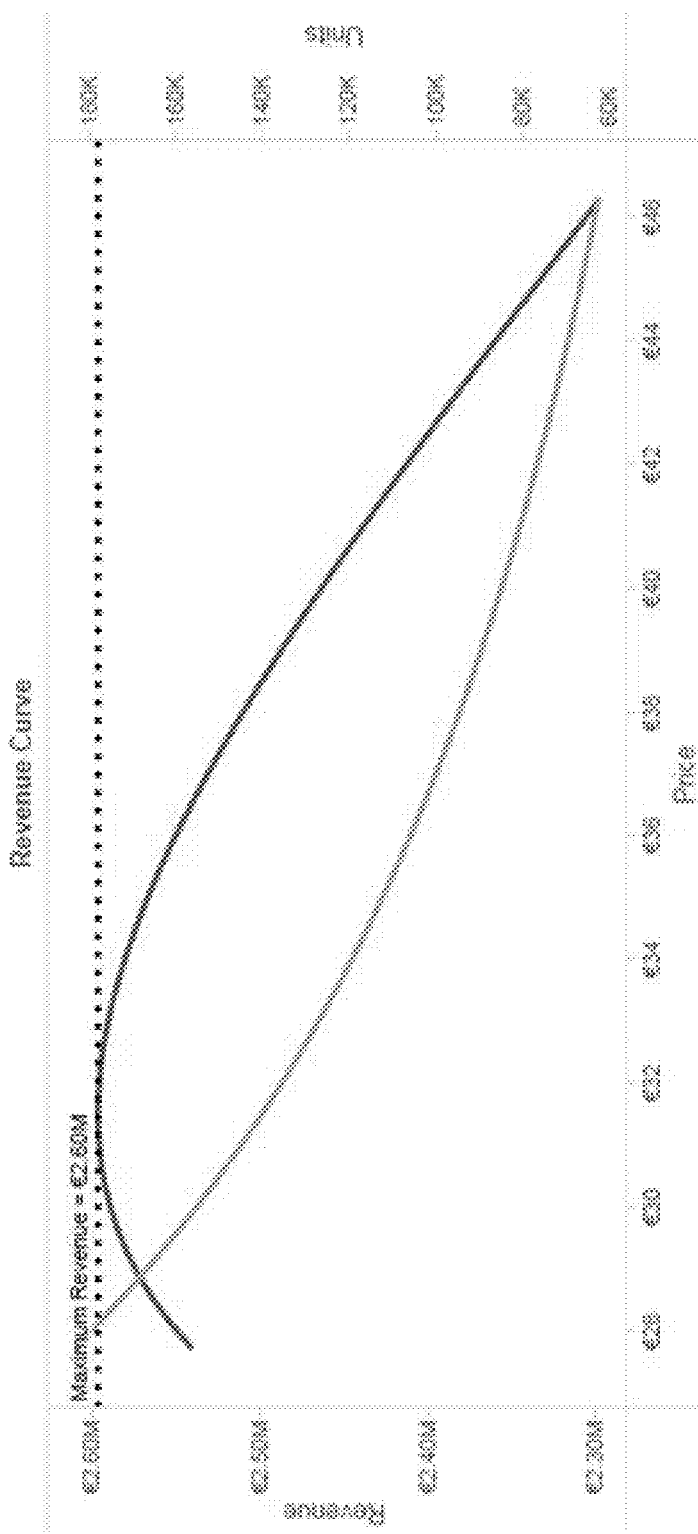
FIG. 12 is a chart of examples of demand and revenue curves.

Also, offer and price modeling may be performed to determine bundle offers. A number of bundle offers for each segment may be identified based on analysis associated with data service usage profiling, application affinity analysis, and monetary value of mobile data used on segments on applications and functionalities. In an embodiment four or five bundle offers for each segment are identified. After the application/service bundle offers have been identified, a price may be determined for the offering. In an embodiment, price elasticity analysis may be done for each offer bundle at a segment level and optimal price may be discovered through pricing simulation to maximize the revenue generated from it. FIG. 12 shows an example of a graph of demand and revenue curves. In an example, a bundle offer may include a price for increased bandwidth (e.g., upload and/or download bandwidth) over a cellular network and/or other networks for a particular usage time or for the particular bundle applications. In another example, users may be incentivized to use the network during off-peak times to reduce the load on the network during peak times, which can improve quality of service during the peak times.

Figure 13:
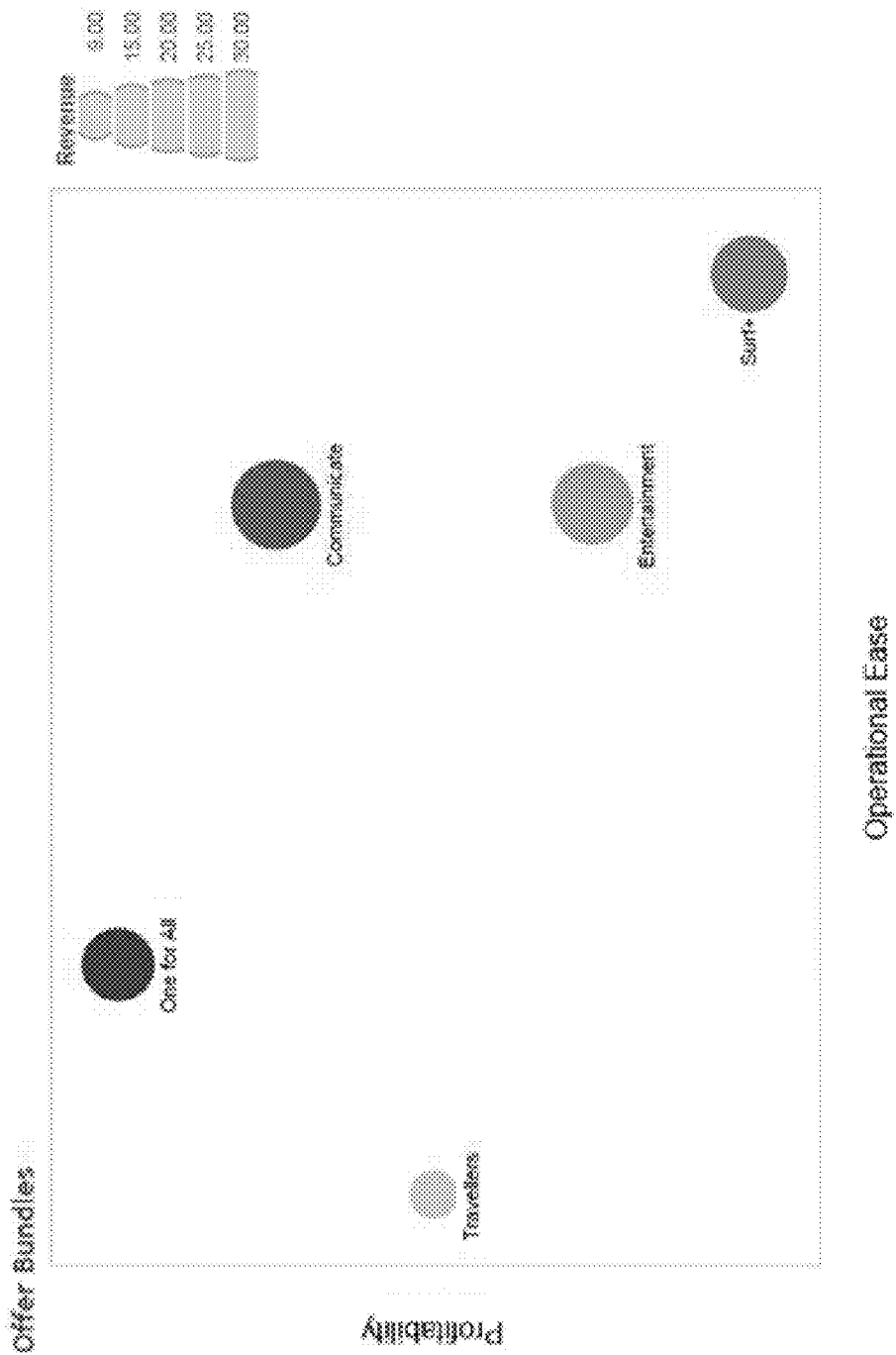
FIG. 13 is a chart of an example of a prioritization matrix.

Based on the revenue potential of each offer, profitability and operational ease, the offers may be prioritized for launch such as shown in FIG. 13. An appropriate offer is selected based on business strategy for each segment for launch based on the results of this analysis. In an embodiment, application or functionality providers may subsidize the cost of a bundle that includes their product by making payments to the customers or directly to a communication service provider.

One or more of the steps of the methods described herein and other steps described herein and one or more of the components of the systems described herein may be implemented as computer code stored on a computer readable storage medium, such as the memory and/or secondary storage, and executed on a computer system, for example, by a processor, application-specific integrated circuit (ASIC), or other controller. The code may exist as software program (s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A system for analyzing data usage of users of a communication network to improve quality of service, the communication network including a network infrastructure comprised of network devices and data usage monitors connected to the network devices, the system comprising:
    data storage to store packet-based network usage data determined from the data usage monitors, wherein the network usage data includes identification of an application generating data transmitted in the network, application functionality, time of day, and bandwidth utilized by each user;
    a network analytics management server including at least one processor, the network analytics management server to:
    determine data usage patterns for each user based on the network usage data; determine user segments from the network usage data, the data usage patterns, user interaction data, user demographic data and user behavior data; and
    determine a bundle of applications and differentiated network data services for each user segment, wherein at least one of the differentiated data services includes a bandwidth allocation modification to an existing data service for the user segment;
    a provisioning server to set network configurations to implement the differentiated data services in the network; and
    determine a monetary value of a byte associated with different functionalities and applications of each segment; and
    determine bundle offers for the differentiated data services for each segment based on the monetary value.

2. The system of claim 1, wherein to determine the user segments, the network analytics management server is to:
    identify network usage variables from the network usage data;
    create derived network usage variables from the identified variables; and
    apply a clustering function to determine a subset of variables from the network usage variables and derived network usage variables and to determine the user segments from the subset of variables.

3. The system of claim 2, wherein to determine the user segments, the network analytics management server is to:
    iteratively generate clusters according to the clustering function from different subsets of the network usage variables and derived network usage variables; and
    evaluate the clusters at each iteration based on at least one of minimum and maximum cluster size, minimum and maximum of clusters, distance between nearest cluster centroids, maximum root mean square standard deviation, and maximum distance between a seed observation and cluster observations.

4. The system of claim 1, wherein, for each segment, the network analytics management server determines affinities of the users of the segment to use particular applications and functionalities together, and identifies the bundle of applications for the segment from the affinities.

5. The system of claim 4, wherein the network analytics management server generates a graphical user interface including affinity analysis graphs for the determined affinities, wherein each graph includes nodes representing applications or application functionalities for the segment, wherein a size or color of the node is representative of an amount of data usage in the segment, and each graph includes edges connecting the nodes, wherein a size or color of each edge is representative of how often the applications or application functionalities of the connected nodes are used together.

6. The system of claim 1, wherein the provisioning server is to set network configurations for at least one of upload bandwidth, download bandwidth, and packet prioritization based on application or functionality.

7. The system of claim 1, to determine data usage patterns, the network analytics management server is to determine top data usage applications and functionalities, determine data usage by time of day and day of week, and determine geographic location of users during data usage.

8. The system of claim 1, wherein the user interaction data comprises information for subscribed data services of the user, transactional billing data, and multi-channel information regarding use and quality of service of the subscribed data services.

9. The system of claim 1, wherein the user behavior data comprises subscribed data services, service usage, product upgrades, billing information, contract information and promotional campaigns used.

10. The system of claim 1, wherein the user demographic data comprises geographic region, age, income range, subscribed data services products, home ownership information, and education level.

11. The system of claim 1, wherein the data usage monitors comprise:

packet analyzers to receive packets associated with the applications of the users transmitting data in the network and to parse packet headers to determine data usage information, wherein parsing the packet headers includes identifying source or destination information for the packets and timestamp information for the packets.

12. A method comprising:

collecting network usage data at a packet-level for users of a network based on packets associated with the users, wherein the network usage data includes identification of applications, application functionality, time of day, and bandwidth;

determining data usage patterns for each user based on the network usage data;

collecting user interaction data, user demographic data and user behavior data;

determining user segments from the network usage data, data usage patterns, user interaction data, user demographic data and user behavior data;

wherein determining the user segments includes identifying network usage variables from the network usage data;

creating derived network usage variables from the identified variables;

applying a clustering function to determine a subset of variables from the network usage variables and derived network usage variables and to determine the user segments from the subset of variables;

determining a bundle of applications and differentiated network data services for each user segment, wherein at least one of the differentiated data services includes a bandwidth allocation modification to an existing data service for the user segment;

delivering the differentiated data services in the network;

determining a monetary value of a byte associated with different functionalities and applications of each segment; and determining bundle offers for the differentiated data services for each segment based on the monetary value.

13. The method of claim 12, comprising:

for each segment, determining affinities of the users of the segment to use particular applications and functionalities together; and identifying the bundle of applications for the segment from the affinities.

14. The method of claim 13, comprising:

generating a graphical user interface including affinity analysis graphs for the determined affinities, wherein each graph includes nodes representing applications or application functionalities for the segment, and wherein a size or color of the node is representative of an amount of data usage in the segment, and each graph includes edges connecting the nodes, wherein a size or color of each edge is representative of how often the applications or application functionalities of the connected nodes are used together.

15. The method of claim 12, comprising:

setting network configurations for at least one of upload bandwidth, download bandwidth, and packet prioritization based on application or functionality.

16. The method of claim 12, wherein determining the user segments comprises:

iteratively generate clusters according to the clustering function from different subsets of the network usage variables and derived network usage variables; and evaluating the clusters at each iteration based on at least one of minimum and maximum cluster size, minimum and maximum of clusters, distance between nearest cluster centroids; maximum root mean square standard deviation, and maximum distance between a seed observation and cluster observations.

17. The method of claim 12, wherein determining the data usage patterns comprises:

determining the data usage patterns from top data usage applications and functionalities, data usage by time of day and day of week, and geographic location of users during data usage.

18. A network management computer comprising:

data storage to store network usage data for users, wherein the network usage data includes identification of applications generating data transmitted in the network, application functionality, time of day, and bandwidth; and at least one processor to:

determine data usage patterns for each user based on the network usage data;

determine user segments from the network usage data, the data usage patterns, and user demographic data, wherein each user segment represents network data usage for a group of users determined to be in the segment;

determine a bundle of applications and differentiated network data services for each user segment, wherein at least one of the differentiated data services includes a bandwidth allocation modification to an existing data service for the user segment;

determine a monetary value of a byte associated with different functionalities and applications of each segment; and determining bundle offers for the differentiated data services for each segment based on the monetary value.

\* \* \* \* \*